(12) United States Patent
Forbes et al.

(10) Patent No.: US 9,367,495 B1
(45) Date of Patent: Jun. 14, 2016

(54) HIGH SPEED INTEGRATED CIRCUIT INTERFACE

(75) Inventors: Mark G. Forbes, San Francisco, CA (US); Chih-Yuan Hsieh, Fremont, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 1826 days.

(21) Appl. No.: 12/242,665

(22) Filed: Sep. 30, 2008

(51) Int. Cl.
G06F 13/28 (2006.01)
G06F 13/40 (2006.01)

(52) U.S. Cl.
CPC ............... *G06F 13/28* (2013.01); *G06F 13/40* (2013.01)

(58) Field of Classification Search
CPC .................................. G06F 13/28; G06F 13/40
USPC ........................................ 710/106; 327/156
See application file for complete search history.

(56) References Cited

U.S. PATENT DOCUMENTS

| | | | | |
|---|---|---|---|---|
| 5,539,401 A | * | 7/1996 | Kumaki et al. ................. | 341/67 |
| 5,615,382 A | * | 3/1997 | Gavin et al. ..................... | 710/53 |
| 5,917,872 A | * | 6/1999 | Ching ............................ | 375/369 |
| 5,940,016 A | * | 8/1999 | Lee ................................ | 341/67 |
| 5,978,688 A | * | 11/1999 | Mullins et al. ................. | 455/557 |
| 6,292,855 B1 | * | 9/2001 | Johnson et al. ................. | 710/33 |
| 6,424,689 B1 | * | 7/2002 | Abe ................................ | 375/366 |
| 6,757,759 B1 | * | 6/2004 | Jones et al. .................... | 710/100 |
| 7,035,292 B1 | * | 4/2006 | Giorgetta et al. .............. | 370/509 |
| 7,127,003 B2 | * | 10/2006 | Rajan et al. .................... | 375/286 |
| 7,185,244 B2 | * | 2/2007 | Kojima et al. ................. | 714/718 |
| 7,634,025 B2 | * | 12/2009 | Gronemeyer et al. ......... | 375/316 |
| 7,702,293 B2 | * | 4/2010 | Ruha et al. ..................... | 455/78 |
| 2003/0020522 A1 | * | 1/2003 | Dellow ......................... | 327/115 |
| 2006/0126758 A1 | * | 6/2006 | Cheng et al. .................. | 375/316 |
| 2007/0160179 A1 | * | 7/2007 | Narathong et al. ............ | 377/47 |
| 2007/0254599 A1 | * | 11/2007 | O'Keeffe et al. .............. | 455/75 |
| 2008/0005405 A1 | * | 1/2008 | Innis et al. .................... | 710/56 |
| 2008/0304118 A1 | * | 12/2008 | Ohmiya ........................ | 358/498 |
| 2009/0212835 A1 | * | 8/2009 | Xu et al. ....................... | 327/156 |

FOREIGN PATENT DOCUMENTS

GB  ep0520650  * 11/1992  .............. G06F 13/42

OTHER PUBLICATIONS

IBM, CoreConnect: The On-Chip Bus System, IBM, Apr. 2001.*
IBM, CoreConnect Bus Architecture, IBM, 2001.*

* cited by examiner

*Primary Examiner* — Tim T Vo
*Assistant Examiner* — Christopher a Daley
(74) *Attorney, Agent, or Firm* — Fenwick & West LLP

(57) ABSTRACT

A method and apparatus for interfacing integrated circuit chips is disclosed. In one embodiment, the interface includes a set of differential data lines over which a variable length register transaction can be conducted.

54 Claims, 5 Drawing Sheets

HIGH SPEED INTEGRATED CIRCUIT INTERFACE

FIELD OF THE INVENTION

Embodiments of the present invention relate to integrated circuit chips, and more particularly, to communication interfaces between integrated circuit chips.

BACKGROUND OF THE INVENTION

A conventional radio control interface includes a low speed 2, 3, or 4 wire configuration interface, such as a serial-peripheral interface (SPI) bus or an I²C™ bus, and one or more dedicated control pins to control the modes of operation of the radio. Such an interface may be used by a baseband chip to control a radio frequency (RF) chip.

Certain radio applications may require high bandwidth and low latency in this interface. One situation where a radio control interface may benefit from low latency is when the baseband chip performs a closed loop control operation, such as automatic gain control. In one example of a closed loop operation, the baseband chip issues a command to the RF chip. The RF chip responds to the command, causing a change in the output from the RF chip to the baseband chip. The signal is then converted to a digital signal by an analog to digital converter (ADC) on the baseband chip and used to determine the next register value to write to the RF chip. In the case of automatic gain control, the baseband chip follows this process to estimate the receive level of a signal digitally and adjust the RF chip gain over a number of iterations bring the received level to a fixed target. Minimizing the latency of the control interface when performing functions such as automatic gain control can provide significant benefits in ease of implementation and can reduce the amount of parallel logic needed to meet timing requirements.

Some radio applications, such as audio or video distribution systems, have high bandwidth requirements for transmission of large amounts of data. Such applications can also benefit from a high bandwidth and low latency interface between the baseband and the RF chips.

SUMMARY OF THE INVENTION

A method and apparatus for a high speed integrated circuit interface are disclosed. In one embodiment, the apparatus includes a set of differential data lines and an output for indicating a transaction length, wherein the apparatus conducts a transaction by transmitting an address over the differential data lines and further transmitting a signal indicating the length of the transaction.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
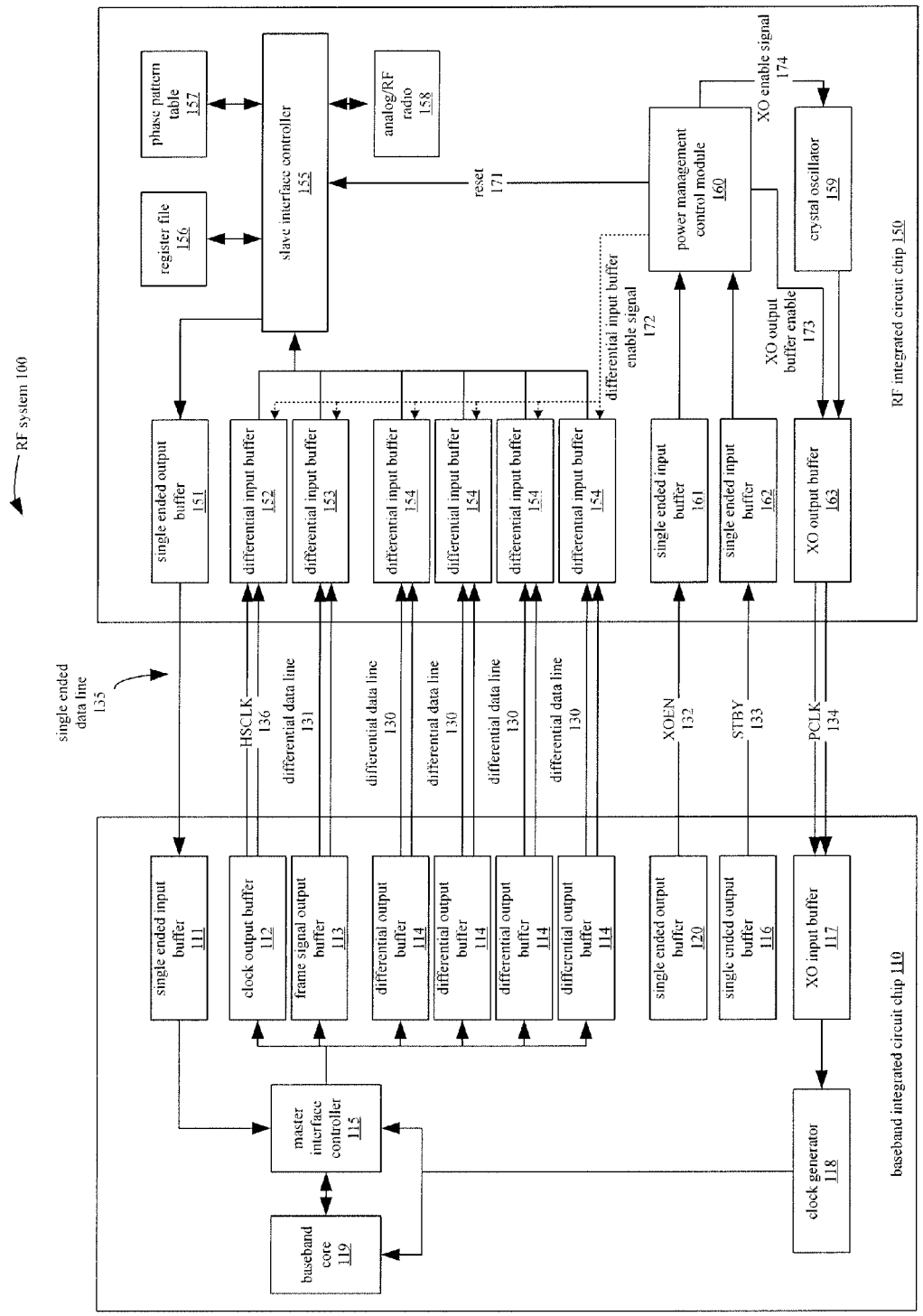
FIG. 1 is a block diagram illustrating an interface between a baseband integrated circuit chip and a radio frequency (RF) integrated circuit chip, according to one embodiment of the invention.

A radio interface between a baseband integrated circuit (IC) chip and a radio frequency (RF) chip is disclosed. In one embodiment, this interface is a high bandwidth and low latency interface operating at an interface clock frequency of approximately 320 MHz with a throughput of $80 \times 10^6$ 8-bit register writes per second and a minimum data latency of 2 clock cycles for an 8-bit write. In one embodiment, the high bandwidth and low latency interface between radio chips supports variable length register transactions that can vary in length from one transaction to the next. In one embodiment, the lengths of the transactions are defined by a frame signal that is asserted at the beginning of the transaction and deasserted at the end of the transaction.

In one embodiment, transactions are conducted over a set of differential data lines for transmitting data in one direction (e.g., where high bandwidth and low latency is required). In one embodiment, the interface also includes a single ended data line for transmitting data in the opposite direction (e.g., where high bandwidth and low latency is not required).

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory, or equivalent electronic computing device. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes by using digital components, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming, or digital design, languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 illustrates a high bandwidth, low latency radio frequency (RF) system, according to one embodiment of the invention. Referring to FIG. 1, RF system 100 includes baseband integrated circuit chip 110 and radio frequency (RF) integrated circuit chip 150, which are connected by one or more sets of differential data lines 130 and 131, differential clock line 134 and single ended data lines 132, 133, and 135. The interface also includes HSCLK (high-speed clock) signal line 136. In one embodiment, RF chip 150 responds to commands issued by baseband chip 110, and transmits data received from baseband chip 110 via radio transmission. Thus, in one embodiment, the baseband chip 110 functions as a master to the RF chip 150, while the RF chip 150 functions as a slave. As a master, baseband chip 110 contains internal logic for issuing commands to RF chip 150. As a slave, RF chip 150 contains logic for changing an operational characteristic of RF chip 150 according to input received from baseband chip 110. In one embodiment, such operational characteristics can include power state, radio transmit power, receiver gain, antenna phase, or other characteristics affecting the operation of RF chip 150. In one embodiment, RF chip 150 responds to commands issued by baseband chip 110 to receive data via radio transmission.

In one embodiment, baseband chip 110 has a set of master interface buffers connected with the differential data lines 130, 131, 134, and 136 and single ended data lines 132, 133, and 135, including a single ended input buffer 111, clock output buffer 112, frame signal output buffer 113, differential output buffers 114, single ended output buffers 155 and 116, and XO (oscillator) input buffer 117. Baseband chip 110 also includes master interface controller 115 to control the interface buffers 111, 112, 113, 114, 120, 116, and 117. Baseband chip 110 further includes a baseband core 119, which is a logic core that controls master interface controller 115, and clock generator 118, which supplies a clock signal to baseband core 119 and master interface controller 115. RF chip 150 has a set of slave interface buffers connected with the differential data lines 130 and the single ended data line 135, including a single ended output buffer 151, differential input buffers 152 and 153, differential input buffers 154, single ended input buffers 161 and 162, and XO output buffer 163. RF chip 150 further includes a slave interface controller 155 connected with the interface buffers 151, 152, 153, and 154. RF chip 150 also includes a register file 156 for storing data. RF chip 150 further includes phase pattern table 157 and analog/RF radio 158, which are both connected to slave interface controller 155. In one embodiment, analog/RF radio 158 is a high speed radio that is capable of transmitting at least one Gigabit of data per second. Power management control module 160 receives input from single ended input buffers 161 and 162 and is connected to slave interface controller 155 through reset signal 171. Power management module 160 also controls differential input buffers 152, 153, and 154 through differential input buffer enable signal 172 and controls XO output buffer 163 through XO output buffer enable signal 173. Power management module 160 controls crystal oscillator 159 through XO enable signal 174.

In one embodiment, the power management interface between baseband chip 110 and RF chip 150 includes the XOEN (oscillator enable) signal 132, the STBY (standby) signal 133, and the PCLK signal 134. The XOEN signal 132 and the STBY signal 133 are the power management interface outputs from the baseband chip. The XOEN signal 132 connects output buffer 120 with input buffer 161. The STBY signal 133 connects output buffer 116 with input buffer 162. The PCLK signal 134 connects XO input buffer 117 with XO output buffer 163. The PCLK signal 134 is a reference oscillator path between RF chip 150 and baseband chip 110, and is implemented using XO output buffer 163, which includes a low swing differential driver, on the RF chip 150. The PCLK signal 134 is received at XO input buffer 117, which is a differential receiver, on the baseband chip 110.

In one embodiment, the signals 132 and 133 are driven by the baseband chip 110 so that the baseband chip 110 controls the power state of the RF chip 150. Components in the RF chip 150 are enabled or disabled according to the power state. This functionality is summarized in Table 1 below.

TABLE 1

Control of RF chip power states through XOEN and STBY signals

| pin value {STBY, XOEN} | power state | digital logic | differential input buffers | RF chip crystal oscillator | RF chip XO output buffer |
|---|---|---|---|---|---|
| 00 | OFF | reset | OFF | OFF | OFF |
| 01 | WAKE | not reset | ON | ON | ON |
| 11 | WAKINGUP | not reset | OFF | ON | OFF |
| 10 | SLEEP | not reset | OFF | OFF | OFF |

In one embodiment, the RF chip 150 has four possible power states: off, wake, waking up, and sleep. Referring to Table 1, the baseband chip 110 invokes different power states by asserting or deasserting the STBY 133 and XOEN 132 signals. For example, baseband chip 110 invokes the "off" state by deasserting both the STBY 133 and XOEN 132 signals and invokes the "wake" state by deasserting STBY 133, while asserting XOEN 132. The STBY 133 and XOEN 132 signals are received at single ended input buffers 162 and 161, respectively, and transmitted to power management module 160. In response to the STBY 133 and XOEN 132 signals, power management module 160 controls other components of RF chip 150. In one embodiment, power management module 160 resets the digital logic in slave interface controller 155 of RF chip 150 using reset signal 171 according to the power state. Referring to Table 1, for example, power management module 160 resets the digital logic in slave interface controller 155 when the power state is "off" and does not reset it if the power state is "wake", "waking up", or "sleep". In one embodiment, power management module 160 enables or disables the differential input buffers 152, 153, and 154 according to the power state through differential input buffer enable signal 172. Referring to Table 1, for example, the differential input buffers 152, 153, and 154 are enabled only in the "wake" state and are disabled in all other power states. Similarly, the power management module 160 enables or disables RF chip crystal oscillator 159 through XO enable signal 174, and enables or disables XO output buffer 163 through XO output buffer enable signal 173, both according to the power state.

In one embodiment, the coding of the power states using the STBY 133 and XOEN 132 signals uses a Gray code, such that the baseband chip 110 can invoke transitions between adjacent power states by changing only one of the STBY 133 or XOEN 132 signals. For example, referring to Table 1, the baseband chip 110 can initiate a transition between "off" and "wake" by changing the state of just the XOEN 132 signal. Similarly, the baseband chip 110 can initiate a transition between "wake" and "waking up" by changing the state of just the STBY 133 signal. In particular, this arrangement reduces the possibility that the baseband chip 110 causes an inadvertent reset of the digital logic in RF chip 150 during a transition from "wake" to "sleep". Such an inadvertent reset may be caused if the baseband chip 110 attempts to transition from the "wake" state directly to the "sleep" state by attempting to change both STBY 133 and XOEN 132 simultaneously. Referring to Table 1, if, during a "wake" to "sleep" transition, XOEN 132 changes to logical 0 before STBY 133 changes to logical 1, an intermediate "off" state (encoded by "00") is invoked, which resets the digital logic. However, in one embodiment using a Gray code to encode the power states, the baseband chip 110 is programmed not to attempt a transition directly from "wake" to "sleep", but instead transitions from "wake" to "waking up" to "sleep", decreasing the likelihood of passing through an intermediate "off" state that resets the digital logic.

Master interface controller 115 resides on baseband chip 110 and controls the master interface buffers 112, 113, and 114. In one embodiment, master interface controller 115 performs such functions as sending data to the buffers 112-114 so the data can be transmitted over the differential data lines 130, or determining when the data is to be transmitted by the buffers 112-114. In one embodiment, master interface controller 115 also receives incoming data from the single ended input buffer 111, and further determines when such data may be received by the buffer 111. In this way, master interface controller 115 acts as an intermediary between the core processing of baseband chip 110 and the interface buffers 111-114.

Slave interface controller 155 resides on RF chip 150 and controls the slave interface buffers 151, 152, 153, and 154. In one embodiment, slave interface controller 155 performs functions such as determining when the slave interface buffers can receive incoming data, and transfers data received at the interface buffers 151-154 to the register file 156.

In one embodiment, register file 156 resides on RF chip 150 and includes a number of registers that can be used to store data or other variables. For example, variables stored in register file 156 may affect the performance or operational characteristics of RF chip 150. In one embodiment, such variables are used to specify parameters such as transmission frequency, transmitter power, receiver gain, or other performance or operational characteristics. In one embodiment, one of the registers within register file 156 is used to define a type of packet so that transmit power of the RF chip 150 can be set differently depending on the type of packet that is defined in the register. In one embodiment, a register in register file 156 is used to set an operating mode of a transmitter of the RF chip 150. For example, a register in register file 156 can be used to turn the transmitter on or off. In one embodiment, a register in register file 156 is used to select an operating mode of a receiver of RF chip 150. For example, the register can be used to select a mode where the receiver only uses one antenna, or used to turn the receiver on or off. In one embodiment, registers within register file 156 also store data that is to be transmitted by RF chip 150. Individual registers in the register file 156 are identified by unique addresses. In one embodiment, registers in the register file 156 can control the power management of crystal oscillator 159, which is the system reference oscillator of the RF chip 150. In an alternative embodiment, a control mechanism separate from the register interface is used to control the power management of crystal oscillator 159.

One way to reduce, and potentially minimize, latency in the interface between baseband chip 110 and RF chip 150 is to reduce the length of the addresses used to specify registers in register file 156. In one embodiment, baseband chip 110 accesses a register in register file 156 by first transmitting a set of bits identifying the address of the register, and then transmitting the data that is to be written in the register. Thus, a shorter address takes less time to transmit over the interface and reduces the duration of the overall transaction.

In one embodiment, register file 156 includes a standard address space that can be accessed using a short address, as well as an extended address space that can be accessed using extended address space registers. In one embodiment, the register file 156 may have a 7-bit standard address space with a 4-wire interface, which allows for an address phase latency of 2 clock cycles. In one embodiment, the register file 156 may have a 7-bit address space with a 2-wire interface, which allows for an address phase latency of 4 clock cycles.

In one embodiment, the baseband chip 110 accesses the extended address space by writing to registers in the standard address space. In one embodiment, the register file 156 includes three registers, one each for "extended address space address register", "extended address space write data register" and "extended address space read data register". In one embodiment, the "extended address space address register" further includes a direction bit to indicate whether the extended address space transaction is a read or a write. Baseband chip 110 reads from the extended address space by writing an address to the "extended address space address register" with the direction bit set to "read", then reading from the "extended address space read data register". Similarly, data is stored in a register in the extended address space by writing the data to the "extended address space data register" and then by writing the register address to the "extended address space address" register with the direction bit set to "write". In one embodiment, registers that require low latency are assigned to the standard address space, while registers not requiring low latency, such as setup or configuration registers, are assigned to the extended address space.

In addition to reduced address length, latency may also be improved by reduced data length. In one embodiment, the smallest data size for a register in register file 156 is 6-bits, allowing for a total register transaction length of 4 clocks cycles for a 4-wire-data interface. In an alternative embodiment, a 2-wire data interface is used, allowing for a total register transaction length of 7 clock cycles.

In one embodiment, registers in register file 156 may have variable lengths, such that not all of the registers are the same length. Registers not requiring a large number of bits can be shorter so that latency can be reduced for transactions with those registers. Also, longer registers are used to reduce address overhead. For example, phased array radios, one particular class of high data rate radios, have control requirements associated with setting the phase of individual antennas. In a phased-array radio, dynamic configuration of the phase of each antenna to one of a discrete number of phases, commonly with 1-bit or 2-bit resolution per antenna, may be desired. For example, the number of bits used to configure a phased array radio can be determined by multiplying the number of antennas by the number of phases available for each antenna. Accordingly, a phased array radio having 36 antennas with 2-bit phase resolution per antenna may require 72-bits of information to configure the antennas. In one embodiment, the register interface is based on to the machine word length of the system CPU, which could be, for example, 32-bits. Thus, in order to configure the phase of the entire radio, the control needs to be split across a number of registers (24 bits in each of 3 registers, in this particular example). With this approach, each register transaction would be associated with an address phase overhead. If variable length register sizes are provided by the interface, the phase of all antennas can be configured with a single 72-bit register transaction and thus reduce the update latency by reducing the address phase overhead.

Data length can also be reduced by encoding bit patterns to reduce the number of data bits sent over the interface. For example, algorithms used to control a phased-array radio can use a small set of specific phase patterns that are predetermined at design or system initialization time. These specific phase patterns could be configured by the single 72-bit register transaction as described above; however, storing the specific patterns inside the RF chip 150 may result in a further increase in throughput and reduction in latency.

In one embodiment, a set of predetermined phase patterns are stored in a lookup table within the RF chip 150 so that a desired phase pattern can be selected using a much shorter register write. In one embodiment, the table can be programmed by writing to one or more registers within register file 156. In one embodiment, the programming is performed by a software sequence in the baseband chip 110. Alternatively, the programming of the table is performed by a hardware sequencer in the baseband chip 110. In one embodiment, the programming is performed during the initialization process of the RF chip. In an alternative embodiment, the programming is performed after the initialization process is complete. In a further alternative embodiment, the table is hardwired in the RF chip using combinatorial logic or a read-only-memory.

If only four different specific phase patterns are to be used, then only two bits would be required to select a desired phase pattern, even though the phase pattern itself may be 72 bits long. Thus, the table would contain four entries of 72-bits, with each entry representing one of the predetermined phase patterns and containing two bits of phase information of each of the 36 antennas. In one embodiment, each of the entries in the table is associated with a 2-bit phase pattern identifier, so that one of four predetermined phase patterns can be selected by writing the phase pattern identifier to a phase array configuration register (not illustrated) within register file 156. Since the phase pattern identifier is only two bits, a register transaction for writing to the phase array configuration register has a data length of two bits. In one embodiment, the length of the phase array configuration register is based on a number of bits needed for distinguishing between each of the available predetermined phase patterns. In one embodiment, the baseband chip 110 includes a control block (not illustrated) that generates the register transaction needed to select the predetermined phase patterns. In an alternative embodiment, the register transaction is generated by another part of baseband chip 110, such as the master interface controller 115 or the baseband core 119.

In one embodiment, the interface between the baseband chip 110 and the RF chip 150 includes four differential data lines 130. Each pair of differential data lines includes two data lines. A differential data line transmits data by inducing opposing signals on its two data lines. For example, when one data line transmits a high bit, another data line transmits a low bit. Differential signaling provides a significant reduction in noise coupling when compared to single-ended signaling, and also works well at high speeds. The differential data lines 130 provide a high bandwidth interface for transmissions from the baseband chip 110 to the RF chip 150. In one embodiment, the baseband chip 110 uses low voltage differential signaling (LVDS) with differential data lines 130 and 131 and clock signal line 136. In one embodiment, the baseband chip 110 uses current mode logic (CML) signaling with differential data lines 130 and 131 and clock signal line 136. In one embodiment, the baseband chip reduces power consumption by operating the CML signaling from the same supply voltage as the baseband core 119.

In one embodiment, the clock signal line HSCLK 136 provides a timing reference signal from the baseband chip 110 to the RF chip 150. The timing reference signal may be any signal that conveys time information, such as a clock signal or another signal that changes periodically. In one embodiment, the data lines 130 and 131 carry synchronous signals that change synchronously with respect to one of the edges of the timing reference signal on HSCLK 136 and last for one clock cycle. In one embodiment, the signals on data lines 130 and 131 are sampled synchronously with respect to one of the edges of the timing reference signal by the RF chip 150.

In one embodiment, baseband chip 110 includes a serial interface, in addition to the differential data lines, that can be used to communicate with other components. In an alternative embodiment, the need for additional package pins and output buffers is reduced by using the high speed differential interface (including data lines 130 and 131) to communicate with a lower speed serial interface by using "bit-banging". According to this arrangement, control lines of the serial configuration interface are mapped to bits of a number of high speed interface registers, and a sequence of high speed register transactions is used to emulate the serial protocol. For example, the serial peripheral interface (SPI) protocol, which has 3 input pins and 1 output pin, could be emulated by assigning the 3 input bits to a high-speed interface write register and the 1 output bit to a high-speed interface read register.

In one embodiment, the differential input buffers 152, 153, and 154 of RF chip 150 are disabled when the RF chip 150 enters a sleep mode to reduce power consumption by the differential input buffers 152, 153, and 154. In one embodiment, power management control module 160 enables or disables the differential input buffers 152, 153, and 154 through differential input buffer enable signal 172. In one embodiment, the power management control module 160 disables differential input buffers 152, 153, and 154 when the power management control module 160 detects that the RF chip 150 has entered sleep mode. In one embodiment, the XO output buffer 163 is disabled when the power management control module 160 detects that the RF chip 150 has entered sleep mode. In one embodiment, the differential output buffers 112, 113, and 114 of the baseband chip 110 are similarly disabled when the baseband chip 110 enters a sleep power mode. In one embodiment, the XO input buffer 117 is similarly disabled when the baseband chip 100 enters a sleep power mode.

The interface between baseband chip 110 and RF chip 150 may also include a single ended data line 135, which may use low power CMOS signaling. In contrast with differential signaling, a single ended data signal uses only one data line 135, and transmits by inducing a signal on the line. The throughput requirements for a master and slave interface, such as a radio interface, are asymmetric. Thus, the set of differential data lines 130 can be used to transmit data from the master (baseband chip 110) to the slave (RF chip 150), where high bandwidth is required, and single ended line 135 can transmit data from the slave to the master, where high bandwidth is not required. In one embodiment, data sent over the low-bandwidth single ended data line 135 may include status information or data returned in response to a read operation. In one embodiment, output buffer 151 includes a very low drive capability single-ended output driver that just meets the timing requirements in order to maximize transition time and thus minimize both noise coupling and electromagnetic interference (EMI).

In one embodiment, the differential interface is clocked using high speed differential clock line HSCLK 136, which connects clock output buffer 112 on baseband chip 110 with differential input buffer 152 on RF chip 150. In one embodiment, HSCLK 136 operates at the same clock frequency as the baseband core 119, which is the core logic of baseband chip 110. In an alternative embodiment, the HSCLK signal 136 operates at a simple rational fraction of the clock frequency of the baseband core 119. For example, the HSCLK signal 136 may operate at one half or double the clock frequency of the baseband core 119.

In one embodiment, the HSCLK signal 136 is gated during periods when no register transaction is taking place in order to reduce noise coupling and EMI during these periods. In one embodiment, HSCLK 136 is allowed to run for a number of cycles beyond a register transaction in order to flush any pipeline stages that are used in the internal state machines of the RF chip 150 or slave interface controller 155.

In one embodiment, the single ended data line 135 operates at a lower clock frequency than the differential data lines 130. The differential data lines can thus use a high speed clock to maintain latency and throughput requirements, while the single ended data line 135 uses a lower frequency clock that is within the capabilities of single ended signaling technology. Running the single ended data line 135 at a reduced clock frequency results in an additional advantage of reducing the potential for noise coupling into the radio. In one embodiment, the single ended data line 135 is clocked at ⅛ of the clock frequency of the differential data lines 130.

In one embodiment, the output buffers 113 and 114 of baseband chip 110 operate on an opposite edge of the HSCLK signal 136 relative to the edge on which the input buffers 153 and 154 of RF chip 150 operate. For example, if the output buffers 113 and 114 operate on a rising edge of HSCLK 136, then the input buffers 153 and 154 operate on the falling edge of HSCLK 136. This arrangement reduces the likelihood of a hold violation.

Figure 2:
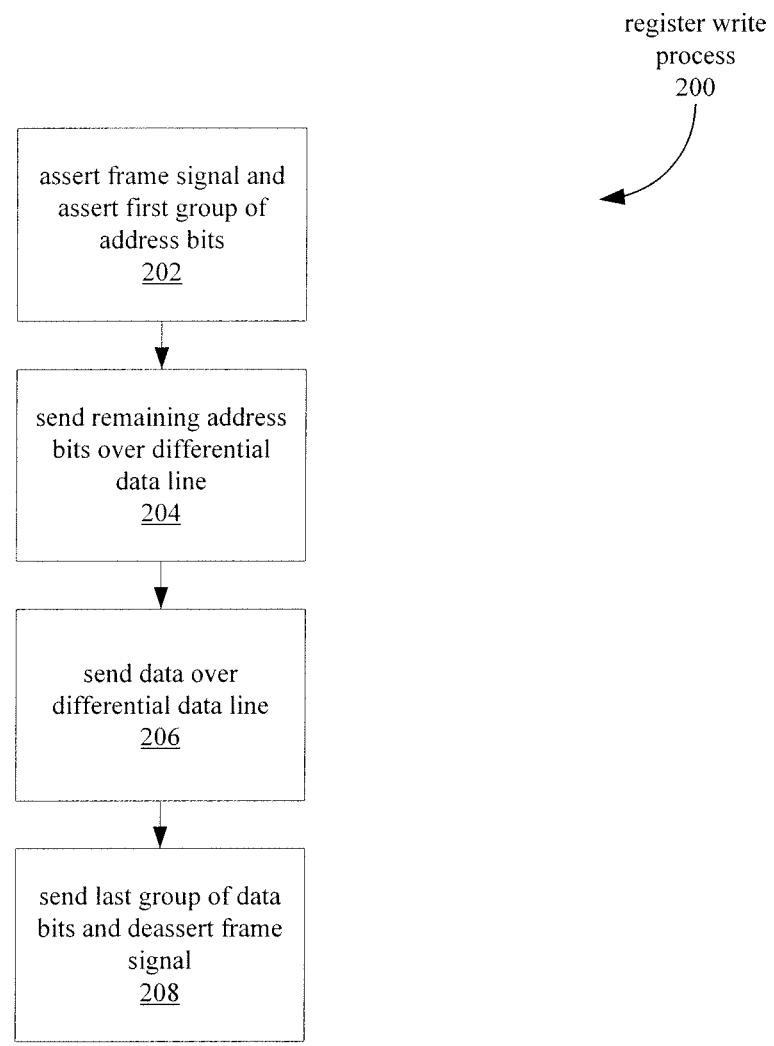
FIG. 2 is a flow diagram illustrating a process for writing data to a register, according to one embodiment of the invention.

FIG. 2 is a flow diagram illustrating a process for conducting a register write transaction according to one embodiment of the invention. In one embodiment, register write process 200 is performed by the baseband chip 110 to write data to a register in register file 156 of RF chip 150. According to one embodiment, a register write transaction is initiated by the baseband core 119 in order to control the operation of RF chip 150. For example, logic in the baseband core 119 may determine an address of a register in the register file 156 and the data to be written to that register in order to invoke a particular operation of the RF chip 150. Thus, baseband core 119 is capable of controlling the operation of RF chip 150 by conducting a register write transaction through master interface controller 115. In one embodiment, each processing block represents the state of a synchronous state machine in the master interface controller 115.

During the execution of register write process 200, master interface controller 115 causes a frame signal to be asserted at processing block 202. The frame signal is output by frame signal output buffer 113 of baseband chip 110. The frame signal is transmitted across differential data line 131 and is received by differential input buffer 153. The assertion of the frame signal indicates to the RF chip 150 that a register transaction has been initiated.

While the frame signal remains asserted, address bits are output by differential output buffers 114 and transmitted over the differential data lines 130. The first group of address bits is asserted during the initial processing block 202 and subsequent groups of address bits are asserted during processing block 204. The address bits identify a register in register file 156 to which the write transaction is directed. In one embodiment, the most significant bit (MSB) of the address bits may be set to "0" to indicate a write transaction. The address bits are received at differential input buffers 154 of RF chip 150. The phase during which the address bits are output is the address phase of the register transaction.

While the frame signal remains asserted, differential output buffers 114 output data bits (processing block 206). The data bits are transmitted across differential data lines 130 and are received at differential input buffers 154. The data bits are then written to the register previously identified by the address bits of blocks 202 and 204.

At processing block 208, master interface controller 115 presents the final group of data bits and causes the frame signal to be deasserted, indicating the end of the transaction. The frame signal being used as part of a variable length register transaction to indicate the length or duration of the variable length register transaction will be further explained below with reference to FIG. 3.

Figure 3:
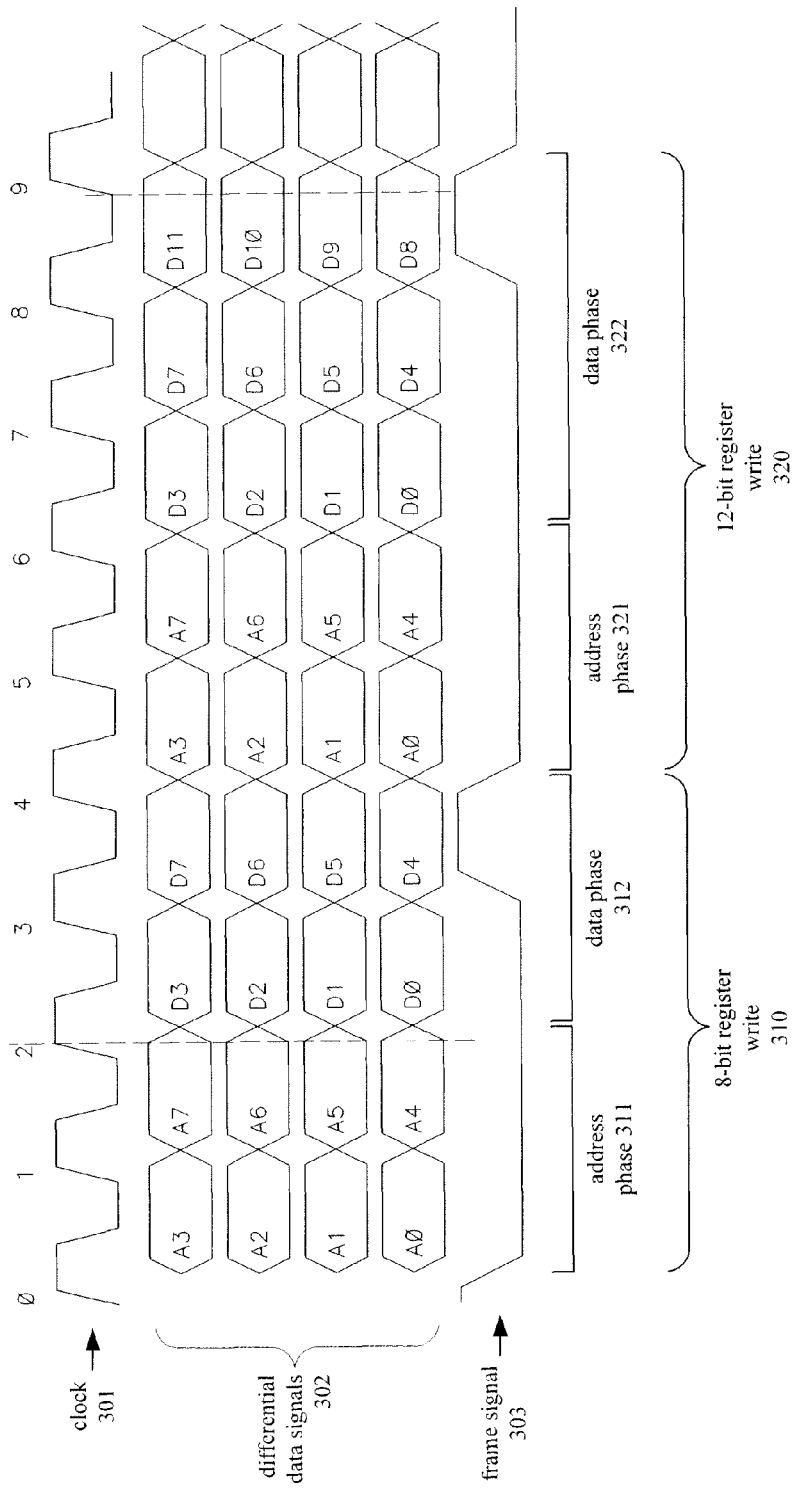
FIG. 3 is a timing diagram illustrating the timing of signals used during a register write process, according to one embodiment of the invention.

FIG. 3 is a timing diagram for register write process 200. The signals illustrated in FIG. 3 include the clock signal 301, differential data signals 302, and frame signal 303. Two register write transactions are illustrated in FIG. 3, including an 8-bit register write transaction 310, comprising address phase 311 and data phase 312, followed by a 12-bit register write transaction 320, comprising address phase 321 and data phase 322.

As previously described, the frame signal 303 is used to indicate the length of the register write transaction. Accordingly, frame signal 303 is asserted low at the beginning of address phase 311 to indicate the start of the 8-bit register write transaction 310. During the address phase 311, differential data signals 302 are used to transmit address bits A0-A7. In one embodiment, the most significant bit (MSB) of the address bits may be set to "0" to indicate a write transaction. The address phase 311 is followed by data phase 312, during which 8 data bits D0-D7 are transmitted across differential data lines 302. During the transmission of the last set of data bits D4-D7, the frame signal 303 is deasserted to indicate the end of the transaction. In one embodiment, the clock signal 301 is left running beyond the end of a sequence of one or more register transactions while holding the frame signal high so that clock signal 301 is available to the RF chip 150. RF chip 150 can then use the clock signal 301 in its internal state machines.

In one embodiment, a state machine in the baseband master interface controller 115 initiates the address phase. Such a state machine can include pipeline logic to reduce latency by beginning the address phase before completing calculation of the data to be output during the data stage. For example, while the calculation of data bits D0-D7 is still being performed, the state machine operating within master interface controller 115 initiates address phase 311. The state machine may initiate address phase 311 at a time when the remaining calculation for data bits D0-D7 can be completed within the duration of address phase 311, so that the calculation of the data bits is completed before data phase 312 begins.

The 12-bit register write 320 is similar to the 8-bit write 310, except that the data transmitted during data phase 322 includes 12 data bits, D0-D11. Also, frame signal 303 is deasserted during the transmission of data bits D8-D11 to indicate that the register write transaction 320 ends after the transmission of data bits D8-D11.

Thus, the frame signal 303 can designate different lengths for subsequent transactions, such that a transaction may differ in length from a previous transaction. In one embodiment, transactions may have different lengths even if the transactions are directed at the same register addresses. This capability allows the number of data bits transmitted to be reduced to decrease latency. In one embodiment, the register write protocol defines a minimum transaction length based on the minimum size of a register in register file 156.

In one embodiment, the baseband chip 110 can conduct a write transaction to a register on register file 156, where the length of the register is not a multiple of the differential data bus width. In this case, the most significant bits (MSBs) of the data are padded with zeroes so that the number of data bits transmitted is a multiple of the data bus width. For example, if a differential data bus having a data bus width of 4 bits is used to write data to a register having a length of 6 bits, an additional two zeros are transmitted along with the 6 bits to be written to the register. Thus, the total number of data bits transmitted is 8 bits, which is a multiple of the data bus width of 4 bits.

In one embodiment, a number of transactions may be conducted in sequence, with the frame signal 303 deasserted for only a single clock cycle. For example, with reference to FIG. 3, the frame signal 303 is deasserted high for only a single clock cycle at the end of data phase 312 to indicate the end of register write 310. Since the frame signal is deasserted for only about one clock cycle at the start of the transmission of data bits D4-D7, the frame signal 303 can be asserted low again at the start of the next clock cycle to indicate the beginning of the next register transaction 320. In this way, latency due to framing overhead is reduced so that useful address or data information is being transmitted during every clock cycle, without a gap of time between transactions.

In one embodiment, the duration of the idle time between register transactions can be controlled. For example, a register transaction may control transmission of a waveform using the radio 158. If the start of transmission begins at a time depending on the completion of the register transaction, the timing of the register transaction can be adjusted to control the start time of the transmission. Similarly, the timing of register transactions can be adjusted to control the timing of other functions, such as receiving a waveform using radio 158. In one embodiment, the master interface controller 115 of baseband chip 110 may implement a state machine that can transition to one or more idle states in between register transactions in order to adjust the timing between the register transactions. During these idle states, the frame signal 303 remains deasserted high to indicate that no register transaction is currently taking place.

In one embodiment, the frame signal is monitored during the register transaction by a state machine in the slave interface controller 155 of RF chip 150 to implement a self-reset mechanism. The state machine receives the frame signal as an active high synchronous reset that returns the state machine to an idle state from all other states, including states where a high value for the frame signal is not allowed by the register write protocol. For example, during a register transaction, if the frame signal is asserted high during an address phase or a data phase indicating a transaction length shorter than the minimum transaction length, the state machine ends the transaction by returning to an idle state. Thus, by holding the frame signal high, the baseband chip 110 is able to reset the state of slave interface controller 155 from any state, even from unwanted states reached by accident. For example, baseband chip 110 can reset the state of slave interface controller 155 from a state reached as a result of a glitch on one of the differential data lines 130 or 131.

In one embodiment, the data bits are transmitted in order from the least significant bit (LSB) to the most significant bit (MSB). With reference to 12-bit register write 320, data bit D0 is the LSB and data bit D11 is the MSB. Presentation of the data LSB first is a useful feature of supporting variable register and transaction lengths which in turn enables the short addresses and thus low latency. If the MSB is presented first, the RF chip 150 will not know at which bit in the register to start writing data until the transaction is terminated by frame signal 303. In contrast, if the LSB is presented first, the LSB and following bits can simply be written to the register as they arrive, starting at the LSB of the register.

Figure 4:
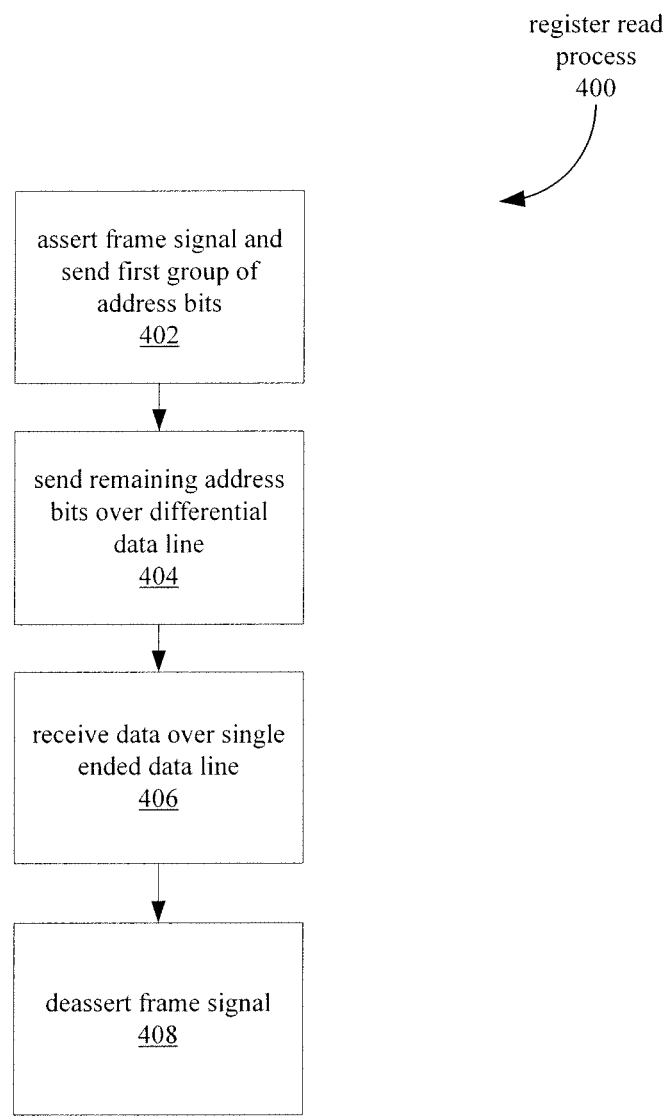
FIG. 4 is a flow diagram illustrating a process for reading data from a register, according to one embodiment of the invention.

FIG. 4 is a flow diagram illustrating a process for conducting a register read transaction according to one embodiment of the invention. Register read process 400 may be performed by the baseband chip 110 to read data from a register in register file 156 of RF chip 150. According to one embodiment, a register read transaction is initiated by baseband core 119 using master interface controller 115.

During the execution of register read process 400, master interface controller asserts a frame signal at block 402. The frame signal may be output by frame signal output buffer 113 of baseband chip 110. The frame signal is transmitted across differential data line 131 and received by differential input buffer 153. The assertion of the frame signal indicates to the RF chip 150 that a register transaction has been initiated.

While the frame signal remains asserted, address bits are output by differential output buffers 114 and transmitted over the differential data lines 130. The first group of address bits is asserted during the initial processing block 402 and subsequent groups of address bits are asserted during block 404. The address bits identify a register in register file 156 from which data is being requested. The MSB of the address bits may further be set to "1" to indicate a read transaction. The address bits are received at differential input buffers 154 of RF chip 150.

The frame signal remains asserted at block 406, where read data is returned by the RF chip 150. The read data bits are output by the single ended output buffer 151, transmitted across single ended data line 135, and received by the baseband chip 110 at single ended input buffer 111.

At block 408, the frame signal is deasserted, indicating the end of the read transaction. Thus the frame signal can be used to conduct a variable length register read transaction. The frame signal can be deasserted by the baseband chip 110 to signal RF chip 150 to terminate the transmission of read data across single ended data line 135. The length of the read transaction is thus determined by baseband chip 110 using the frame signal.

Figure 5:
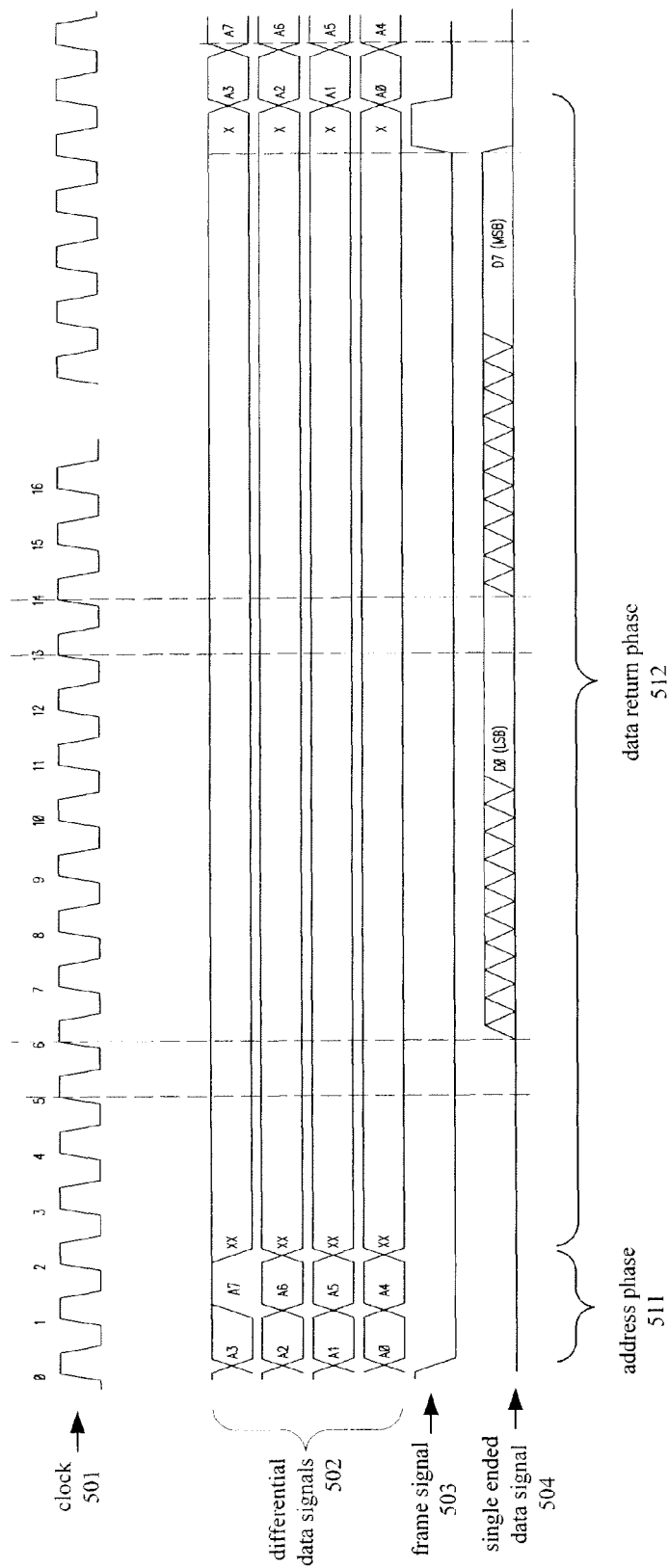
FIG. 5 is a timing diagram illustrating the timing of signals used during a register read process, according to one embodiment of the invention.

FIG. 5 is a timing diagram for register read process 400. The electrical signals illustrated in FIG. 5 include the clock signal 501, differential data signals 502, frame signal 503, and single ended data line 504.

As previously described, the frame signal 503 is used to indicate the length of the read transaction. Accordingly, frame signal 503 is asserted low at the beginning of address phase 511 to indicate the start of the read transaction. During the address phase 511, differential data signals 502 are used to transmit address bits A0-A7. In one embodiment, the most significant bit (MSB) of the address bits may be set to 1 to indicate a read transaction.

In one embodiment, following the address phase 511, the RF chip 150 waits for a predetermined number of cycles before returning the requested data. For example, the RF chip 150 may wait for 4 cycles before returning data. This example is illustrated in FIG. 5, where address phase 511 ends at clock cycle 2 and RF chip 150 waits until clock cycle 6 to return data, which is 4 clock cycles after the end of address phase 511. In one embodiment, this number of wait cycles is chosen so enough time is allowed for the data to be read from the internal registers or memory of RF chip 150 before it is transmitted.

The address phase 511 is followed by data return phase 512, during which the data requested by the read transaction is returned by RF chip 150 over single ended data line 135. Baseband chip 110 terminates the transmission of read data by deasserting frame signal 503. Accordingly, RF chip 150 samples frame signal 503 and ceases transmission of read data upon detecting that frame signal 503 has been deasserted.

During the time that the frame signal 503 is asserted, the RF chip 150 presents the requested read data one bit at a time, starting with the least significant bit (LSB). The bits of data are presented at intervals of F clock cycles. For example, with reference to FIG. 5, the least significant data bit #0 is presented at clock cycle 6, followed by the next bit (bit #1) which is presented at clock cycle 14. In this example, F is equal to 8 clock cycles. Thus, each successive bit of the read data will be presented 8 clock cycles after the previous bit. In one embodiment, due to the round-trip propagation delay of signals through the baseband chip clock output buffer 112, inter-chip printed circuit board (PCB), RF chip differential input buffer 152, RF chip clock tree, RF chip slave state machine, RF chip single-ended output buffer 151, inter-chip PCB return trip, and baseband chip single-ended input buffer 111, the actual data transition on single ended data signal 504 at the baseband end of the link may be significantly delayed with respect to the clock edge in the baseband chip 110. This is illustrated by the crosshatching in FIG. 5 on the single ended data signal 504 after cycles 6 and 14. In one embodiment, to allow the largest possible round trip delay, a state machine register operating on the baseband chip 110 samples each data bit from the single ended data signal 504 at the last clock edge before the next read data bit is presented. For example, referring to FIG. 5, the LSB bit #0 is sampled on clock edge 14. This arrangement tolerates a propagation delay of F clock cycles, where in this case, F equals 8.

In one embodiment, the baseband chip 110 samples the frame signal 503 at the end of the data transmission cycle of each bit. For example, referring to FIG. 5, the RF chip 150 may sample the frame signal 503 at clock edge 14, which is at the end of the data transmission cycle for bit #0. The RF chip 150 similarly samples the frame signal 503 at the end of data transmission cycle for each subsequent data bit. If the RF chip 150 detects that the frame signal 503 is asserted low, then the RF chip 150 continues with sending the next bit of the requested read data. If the RF chip detects that the frame signal 503 is deasserted high, then the RF chip terminates the transaction and does not send any more data bits.

The baseband chip 110 can thus perform a "short read" of a particular register by requesting fewer than all of the bits in the register. For example, the baseband chip initiates a read transaction from a 32-bit register, and then terminates the transaction after receiving only 16 of the bits, thus reducing the duration of the transaction. A "long read" of the register may also be performed, where all of the bits in the register are requested. For a "long read", the baseband chip 110 may simply refrain from terminating the read transaction until all of the read data bits have been received.

In one embodiment, the returned read data may be transmitted in order from the LSB to the MSB. This arrangement simplifies the transmission of data read from registers when the length of the registers is variable. If the MSB is transmitted first, then the RF chip 150 would first need to determine which bit in the register is the MSB based on the width of the register. For example, for an 8-bit register, the RF chip 150 would have to select bit #7 but for a 16-bit register it would have to select bit #15. If the LSB is transmitted first, the transmission would always begin with bit #0, and specific knowledge of the width of individual registers would not be required.

In one embodiment, baseband chip 110 and RF chip 150 are part of a packet based radio system where read transactions are conducted in between packet transmissions or during other periods of radio inactivity, where the radio is neither transmitted or receiving. This arrangement minimizes the effect of noise coupled by the single ended read data signal into the radio.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An integrated circuit chip, comprising:
   a logic core operable to control a second integrated circuit chip;
   a differential clock output for providing a timing reference signal to the second integrated circuit chip;
   a set of differential data outputs for transmitting an address over a set of differential data lines to the second integrated circuit chip; and an output to transmit a signal indicating a length of a variable length register transaction based on a time period the signal is asserted, wherein the length of the register transaction is different from the length of a previous register transaction between the integrated circuit chip and the second integrated circuit chip.

2. The integrated circuit chip of claim 1, wherein the signal indicating the length of the register transaction is a frame signal.

3. The integrated circuit chip of claim 1, wherein the register transaction comprises a write transaction directed at the second integrated circuit chip.

4. The integrated circuit chip of claim 1, further comprising a single ended data line operable to receive data from the second integrated circuit chip, wherein the register transaction comprises a read request directed at the second integrated circuit chip.

5. The integrated circuit chip of claim 4, wherein the data is received over the single ended data line during a period of radio inactivity.

6. The integrated circuit chip of claim 4, wherein the single ended data line is clocked at a lower frequency than the set of differential data lines.

7. The integrated circuit chip of claim 4, wherein the single ended data line is clocked at one-eighth of the frequency used to clock the set of differential data lines.

8. The integrated circuit chip of claim 1, wherein the set of differential data lines includes four differential data lines.

9. The integrated circuit chip of claim 1, wherein data bits transmitted over the set of differential signal lines are transmitted in order from a least significant bit (LSB) to a most significant bit (MSB).

10. The integrated circuit of claim 1, wherein the output signals change synchronously with respect to an edge of the timing reference signal.

11. The integrated circuit chip of claim 1, wherein the register transaction indicates a type of packet to be transmitted by the second integrated circuit chip.

12. The integrated circuit chip of claim 1, further comprising a power management interface output operable to cause the second integrated circuit chip to operate in one of a plurality of power states.

13. The integrated circuit chip of claim 12, wherein the plurality of power states is encoded using a Gray code such that encodings for adjacent power states differ by one bit.

14. The integrated circuit chip of claim 4, wherein a sequence of one or more register transactions emulates a low speed interface.

15. The integrated circuit chip of claim 14, wherein the low speed interface is a serial peripheral interface (SPI).

16. An integrated circuit chip, comprising:
  logic operable to change an operational characteristic of the integrated circuit chip according to input from a second integrated circuit chip;
  a differential clock input for receiving a timing reference signal from the second integrated circuit chip;
  a set of differential data lines for receiving an address from the second integrated circuit chip; and
  an input to receive a signal indicating a length of a variable length register transaction based on a time period the signal is asserted, wherein the length of the register transaction is different from the length of a previous register transaction between the integrated circuit chip and the second integrated circuit chip.

17. The integrated circuit chip of claim 16, wherein the signal indicating the length of the register transaction is a frame signal.

18. The integrated circuit chip of claim 16, wherein the register transaction comprises a write transaction directed at that integrated circuit chip.

19. The integrated circuit chip of claim 16, further comprising a single ended data line for transmitting data to the second integrated circuit chip in response to the register transaction, wherein the register transaction comprises a read request directed at the integrated circuit chip.

20. The integrated circuit chip of claim 19, wherein the data is transmitted over the single ended data line during a period of radio inactivity.

21. The integrated circuit chip of claim 19, wherein the single ended data line is clocked at a lower frequency than the set of differential data lines.

22. The integrated circuit chip of claim 19, wherein the single ended data line is clocked at one-eighth of the frequency used to clock the set of differential data lines.

23. The integrated circuit chip of claim 16, wherein the set of differential data lines includes four differential data lines.

24. The integrated circuit chip of claim 16, wherein data bits received over the set of differential signal lines are received in order from a least significant bit (LSB) to a most significant bit (MSB).

25. The integrated circuit chip of claim 16, further comprising an extended address space register operable to provide access to memory addressed by an extended address space.

26. The integrated circuit of claim 16, wherein the signals are sampled synchronously with respect to an edge of the timing reference signal.

27. The integrated circuit chip of claim 16, further comprising a lookup table that stores a plurality of bit patterns, wherein one of the bit patterns is selectable by the register transaction.

28. The integrated circuit chip of claim 27, wherein each of the bit patterns represents a phase pattern for configuring a phased-array radio.

29. The integrated circuit chip of claim 16, further comprising a power management module operable to cause the integrated circuit chip to operate in one of a plurality of power states based on input from the second integrated circuit chip.

30. The integrated circuit chip of claim 29, wherein the plurality of power states is encoded using a Gray code such that encodings for adjacent power states differ by one bit.

31. The integrated circuit chip of claim 29, wherein the power management module is operable to enable a reference oscillator signal output.

32. The integrated circuit chip of claim 16, further comprising a high speed radio capable of transmitting at least 1 Gigabit per second.

33. A system, comprising:
  a first integrated circuit chip including a logic core operable to control a second integrated circuit chip;
  the second integrated circuit chip, wherein the second integrated circuit chip includes logic operable to change an operational characteristic of the second integrated circuit chip, and wherein the second integrated circuit chip is coupled with the first integrated circuit chip through a set of differential data lines and clock line, wherein the set of differential data lines is for transmitting an address from the first integrated circuit chip to the second integrated circuit chip; and the clock line provides a timing reference signal from the first integrated circuit chip to the second integrated circuit chip;
  a data line operable to transmit to the second integrated circuit chip a signal indicating a length of the variable length register transaction based on a time period the signal is asserted, wherein the length of the register transaction is different from the length of a previous register transaction between the first integrated circuit chip and the second integrated circuit chip.

34. The system of claim 33, wherein the signal indicating the length of the register transaction is a frame signal.

35. The system of claim 33, wherein the register transaction comprises a write transaction directed at the second integrated circuit chip by the first integrated circuit chip.

36. The system of claim 33 wherein signals on the data lines change synchronously with respect to an edge of the timing reference signal.

37. The system of claim 33, further comprising a single ended data line operable to transmit data from the second integrated circuit chip to the first integrated circuit chip, wherein the register transaction comprises a read request directed at the second integrated circuit chip by the first integrated circuit chip.

38. The system of claim 37, wherein the data is transmitted over the single ended data line during a period of radio inactivity.

39. The system of claim 37, wherein the single ended data line is clocked at a lower frequency than the set of differential data lines.

40. The system of claim 37, wherein the single ended data line is clocked at one-eighth of the frequency used to clock the set of differential data lines.

41. The system of claim 33, wherein the set of differential data lines includes four differential data lines.

42. The system of claim 33, wherein data bits transmitted over the set of differential signal lines are transmitted in order from a least significant bit (LSB) to a most significant bit (MSB).

43. The system of claim 33, further comprising an extended address space register operable to provide access to memory addressed by an extended address space.

44. A method of operating an integrated circuit chip, the method comprising:
   initiating a variable length register transaction by transmitting an address to a second integrated circuit chip over a set of differential data lines; and
   transmitting to the second integrated circuit chip a signal indicating a length of the register transaction based on a time period the signal is asserted, wherein the length of the register transaction is different from the length of a previous register transaction between the integrated circuit chip and the second integrated circuit chip.

45. The method of claim 44, wherein the signal indicating the length of the register transaction is a frame signal.

46. The method of claim 44, wherein the register transaction comprises a write transaction directed at the second integrated circuit chip.

47. The method of claim 44, further comprising receiving data from the second integrated circuit chip over a single ended data line, wherein the register transaction comprises a read request directed at the second integrated circuit chip.

48. The method of claim 47, wherein the data is received over the single ended data line during a period of radio inactivity.

49. The method of claim 47, wherein the single ended data line is clocked at a lower frequency than the set of differential data lines.

50. The method of claim 47, wherein the single ended data line is clocked at one-eighth of the frequency used to clock the set of differential data lines.

51. The method of claim 47, wherein the set of differential data lines includes four differential data lines.

52. The method of claim 44, wherein data bits transmitted over the set of differential signal lines are transmitted in order from a least significant bit (LSB) to a most significant bit (MSB).

53. The method of claim 44, wherein the register transaction accesses data in an extended address space by writing to an extended address space register.

54. The method of claim 44, wherein the register transaction indicates a type of packet to be transmitted by the second integrated circuit chip.

\* \* \* \* \*